United States Patent
Fujimoto et al.

(10) Patent No.: US 6,462,936 B1
(45) Date of Patent: Oct. 8, 2002

(54) SOLID ELECTROLYTIC CAPACITOR

(75) Inventors: Masahisa Fujimoto; Shin Fujitani, both of Osaka; Koji Nishio, Kyoto, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/806,467

(22) PCT Filed: Oct. 22, 1999

(86) PCT No.: PCT/JP99/05867

§ 371 (c)(1),
(2), (4) Date: Apr. 2, 2001

(87) PCT Pub. No.: WO00/25331

PCT Pub. Date: May 4, 2000

(30) Foreign Application Priority Data

Oct. 26, 1998 (JP) .......................................... 10-321457

(51) Int. Cl.$^7$ ............................................... H01G 9/02
(52) U.S. Cl. ...................... 361/525; 361/523; 361/532; 361/528; 361/518; 29/25.03
(58) Field of Search .................. 361/525, 523, 361/528, 508, 509, 512, 529, 502, 504, 511, 532, 311; 29/25.03

(56) References Cited

U.S. PATENT DOCUMENTS

| | | | | |
|---|---|---|---|---|
| 5,117,332 A | * | 5/1992 | Kudoh et al. | 361/525 |
| 5,140,502 A | * | 8/1992 | Kudoh et al. | 361/540 |
| 5,428,500 A | * | 6/1995 | Nishiyama et al. | 361/525 |
| 5,654,869 A | * | 8/1997 | Ohi et al. | 361/540 |
| 6,088,218 A | * | 7/2000 | Hamada et al. | 361/523 |
| 6,110,234 A | * | 8/2000 | Sakata et al. | 29/25.03 |
| 6,343,005 B1 | * | 1/2002 | Tadanobu et al. | 361/532 |

FOREIGN PATENT DOCUMENTS

| | | |
|---|---|---|
| JP | 6037114 | 2/1985 |
| JP | 6449211 | 2/1989 |
| JP | A8255730 | 10/1996 |
| JP | A974050 | 3/1997 |
| JP | A1036687 | 10/1998 |

* cited by examiner

*Primary Examiner*—Dean A. Reichard
*Assistant Examiner*—Nguyen Ha
(74) *Attorney, Agent, or Firm*—Birch Stewart Kolasch & Birch LLP

(57) ABSTRACT

The solid electrolytic capacitor of the invention contains an anode, a dielectric film formed on the anode by anodic oxidation, a solid electrolytic layer formed on the dielectric film, and a cathode connected with the solid electrolytic layer, the solid electrolytic layer being made from a conducting polymer obtained by doping with alkyl sulfonic acid ions, a polymer including a heterocyclic monomer unit represented by the following general formula as a repeating unit:

$$\begin{array}{c} R^1 \quad R^2 \\ \diagdown \diagup \\ \text{ring with X} \end{array}$$

The solid electrolytic capacitor of the invention has large capacitance and exhibits low impedance in a high frequency region.

4 Claims, 1 Drawing Sheet

A1 (Solid Electrolytic Capacitor)

4 (Carbon Paste layer)
3 (Solid Electrolitic Layer)
5 (Silver Paste layer)
6 (Silver Paste layer)
1 (Anode)
9 (Cathode Terminal)
8 (Anode Terminal)
7 (Housing Resin)
2 (Dielectric Film)

SOLID ELECTROLYTIC CAPACITOR

This application is the national phase under 35 U.S.C. §371 of PCT International Application No. PCT/JP99/05867 which has an International filing date of Oct. 22, 1999, which designated the United States of America.

TECHNICAL FIELD

The present invention relates to a solid electrolytic capacitor comprising a solid electrolytic layer of a conducting polymer formed on a dielectric film, and in particular, it relates to improvement of the solid electrolytic layer for the purpose of providing a solid electrolytic capacitor having large capacitance and exhibiting low impedance in a high frequency region.

BACKGROUND ART

In accordance with recent trend in reducing the size and weight of electronic equipment, there are increasing demands for a compact capacitor having large capacitance and exhibiting low impedance in a high frequency region.

Capacitors conventionally used in a high frequency region are a plastic capacitor, a mica capacitor and a laminated ceramic capacitor, all of which are large in size and have a capacitance difficult to increase.

As a capacitor having large capacitance, an electrolytic capacitor is well known. Examples of the electrolytic capacitor are an electrolytic capacitor using an electrolyte (such as an aluminum electrolytic capacitor) and a solid electrolytic capacitor.

Recently, a conducting polymer prepared by doping a polymer, such as polypyrrole and polythiophene, which is obtained by electrolytically polymerizing a heterocyclic monomer such as pyrrole or thiophene, with $BF_4^-$ (borofluoride ions) or $ClO_4^-$ (perchlorate ions) has been proposed as a solid electrolyte usable instead of manganese dioxide (Japanese Laid-Open Patent Publication No. 60-37114/1985).

The conducting polymer obtained by using the aforementioned halogen anions as a dopant, however, can easily degrade a dielectric film. In addition, the conducting property of the conducting polymer can be easily lowered because it is poor in thermal stability and can be easily undoped. The conducting polymer can be easily undoped particularly in fixing an electrode at a high temperature of approximately 200° C.

The degradation of the dielectric film and the lowering of the conducting property of the conducting polymer can increase a leakage current in a capacitor, resulting in reducing the capacitance and increasing the impedance.

A conducting polymer obtained by using aryl sulfonic acid ions such as dodecylbenzene sulfonic acid ions and naphthalene sulfonic acid ions, as a dopant has been proposed for overcoming the aforementioned disadvantages (Japanese Laid-Open Patent Publication No. 64-49211/1989).

The conducting polymer obtained by using aryl sulfonic acid ions as a dopant has still rather high electric resistance although the electric resistance is lower than that of the conducting polymer obtained by using $BF_4^-$ or $ClO_4^-$ as a dopant. Therefore, even when this conducting polymer is used as a solid electrolyte, it is difficult to obtain a solid electrolytic capacitor exhibiting low impedance in a high frequency region.

The present invention was devised in view of these conventional disadvantages, and a main object of the invention is providing a solid electrolytic capacitor having large capacitance and exhibiting low impedance in a high frequency region.

DISCLOSURE OF THE INVENTION

A solid electrolytic capacitor of the invention (hereinafter referred to as a first capacitor) comprises an anode, a dielectric film formed on the anode by anodic oxidation, a solid electrolytic layer formed on the dielectric film made from a conducting polymer produced by doping a polymer including a heterocyclic monomer unit represented by the following general formula as a repeating unit with alkyl sulfonic acid ions and sulfuric acid ions, and a cathode connected with the solid electrolytic layer.

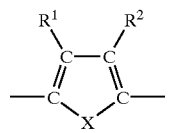

Another solid electrolytic capacitor of the invention (hereinafter referred to as a second capacitor) comprises an anode, a dielectric film formed on the anode by anodic oxidation, a solid electrolytic layer formed on the dielectric film made from a conducting polymer obtained by doping a polymer including a heterocyclic monomer unit represented by the following general formula as a repeating unit with alkyl sulfonic acid ions in a ratio of one of the alkyl sulfonic acid ions per 2 through 5 heterocyclic monomer units represented by the general formula, and a cathode connected with the solid electrolytic layer. In this specification, the first capacitor and the second capacitor may be generically referred to as the capacitors of the invention.

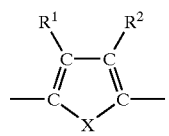

wherein $R^1$ and $R^2$ independently indicate an alkyl group or H, and X is S or $NR^3$ (wherein $R^3$ indicates an alkyl group or H).

The solid electrolytic layer is preferably formed by electrolytic polymerization using, as a solution for electrolytic polymerization, an aqueous solution including a heterocyclic monomer such as pyrrole or thiophene and an ionic dopant such as alkyl sulfonic acid ions, because the dopant can be uniformly doped in the polymer in this manner.

The conducting polymer used in the first capacitor is preferably doped in a ratio of one ion of the dopant per 2 through 5 heterocyclic monomer units each represented by the above-described formula. The molar ratio between sulfuric acid ions and alkyl sulfonic acid ions used for doping in electrolytic polymerization is not specified. It is, however, confirmed through experiments that the maximum molar ratio is 10:1. The sulfuric acid ions cannot be doped exceeding this molar ratio. ions such as dodecylbenzene sulfonic acid ions and naphthalene sulfonic acid ions, as a dopant has been proposed for overcoming the aforementioned disadvantages (Japanese Laid-Open Patent Publication No. 64-49211/1989).

The conducting polymer obtained by using aryl sulfonic acid ions as a dopant has still rather high electric resistance although the electric resistance is lower than that of the conducting polymer obtained by using $BF_4^-$ and $ClO_4^-$ as a dopant. Therefore, even when this conducting polymer is used as a solid electrolyte, it is difficult to obtain a solid electrolytic capacitor exhibiting low impedance in a high frequency region.

The present invention was devised in view of these conventional disadvantages, and a main object of the invention is providing a solid electrolytic capacitor having large capacitance and exhibiting low impedance in a high frequency region.

DISCLOSURE OF THE INVENTION

A solid electrolytic capacitor of the invention (hereinafter referred to as a first capacitor) comprises an anode, a dielectric film formed on the anode by anodic oxidation, a solid electrolytic layer formed on the dielectric film made from a conducting polymer produced by doping a polymer including a heterocyclic monomer unit represented by the following general formula as a repeating unit with alkyl sulfonic acid ions and sulfuric acid ions, and a cathode connected with the solid electrolytic layer. Another solid electrolytic capacitor of the invention (hereinafter referred to as a second capacitor) comprises an anode, a dielectric film formed on the anode by anodic oxidation, a solid electrolytic layer formed on the dielectric film made from a conducting polymer obtained by doping a polymer including a heterocyclic monomer unit represented by the following general formula as a repeating unit with alkyl sulfonic acid ions, and a cathode connected with the solid electrolytic layer. In this specification, the first capacitor and the second capacitor may be generically referred to as the capacitors of the invention.

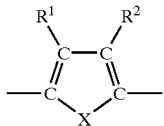

wherein $R^1$ and $R^2$ independently indicate an alkyl group or H, and X is S or $NR^3$ (wherein $R^3$ indicates an alkyl group or H).

The solid electrolytic layer is preferably formed by electrolytic polymerization using, as a solution for electrolytic polymerization, an aqueous solution including a heterocyclic monomer such as pyrrole or thiophene and an ionic dopant such as alkyl sulfonic acid ions, because the dopant can be uniformly doped in the polymer in this manner.

The conducting polymer is preferably doped in a ratio of one ion of the dopant per 2 through 5 heterocyclic monomer units each represented by the above-described formula. The molar ratio between sulfuric acid ions and alkyl sulfonic acid ions used for doping in electrolytic polymerization is not specified. It is, however, confirmed through experiments that the maximum molar ratio is 10:1. The sulfuric acid ions cannot be doped exceeding this molar ratio.

It is preferable to use aluminum or tantalum as an anode material because a dielectric obtained by anodic oxidation provides a high dielectric constant and a high electrical insulating property. Since the dielectric film is formed by the anodic oxidation, when the anode is made from aluminum or tantalum, the dielectric film is formed from an oxide of aluminum or tantalum.

The dopants used in the fabrication of the capacitors of the invention are not halogen anions such as $BF_4^-$ and $ClO_4^-$ but are non-halogen anions, and hence, the dielectric film is difficult to degrade. Also, the alkyl sulfonic acid ions exhibit higher thermal stability and are more difficult to undope as compared with $BF_4^-$ and $ClO_4^-$ even when they are exposed to a high temperature, for instance, in fixing an electrode. Therefore, the electric conductivity of the conducting polymer is not easily lowered. For these reasons, in the capacitors of the invention the leakage current is small and the deterioration of properties is small even when they are exposed to a high temperature. Moreover, since the electric resistance of the conducting polymer doped with alkyl sulfonic acid ions is lower than that of the conducting polymer doped with aryl sulfonic acid ions, the capacitors of the invention exhibit lower impedance and better frequency characteristic as compared with the solid electrolytic capacitor disclosed in Japanese Laid-Open Patent Publication No. 64-49211/1989.

PREFERRED EMBODIMENT

Figure 1:
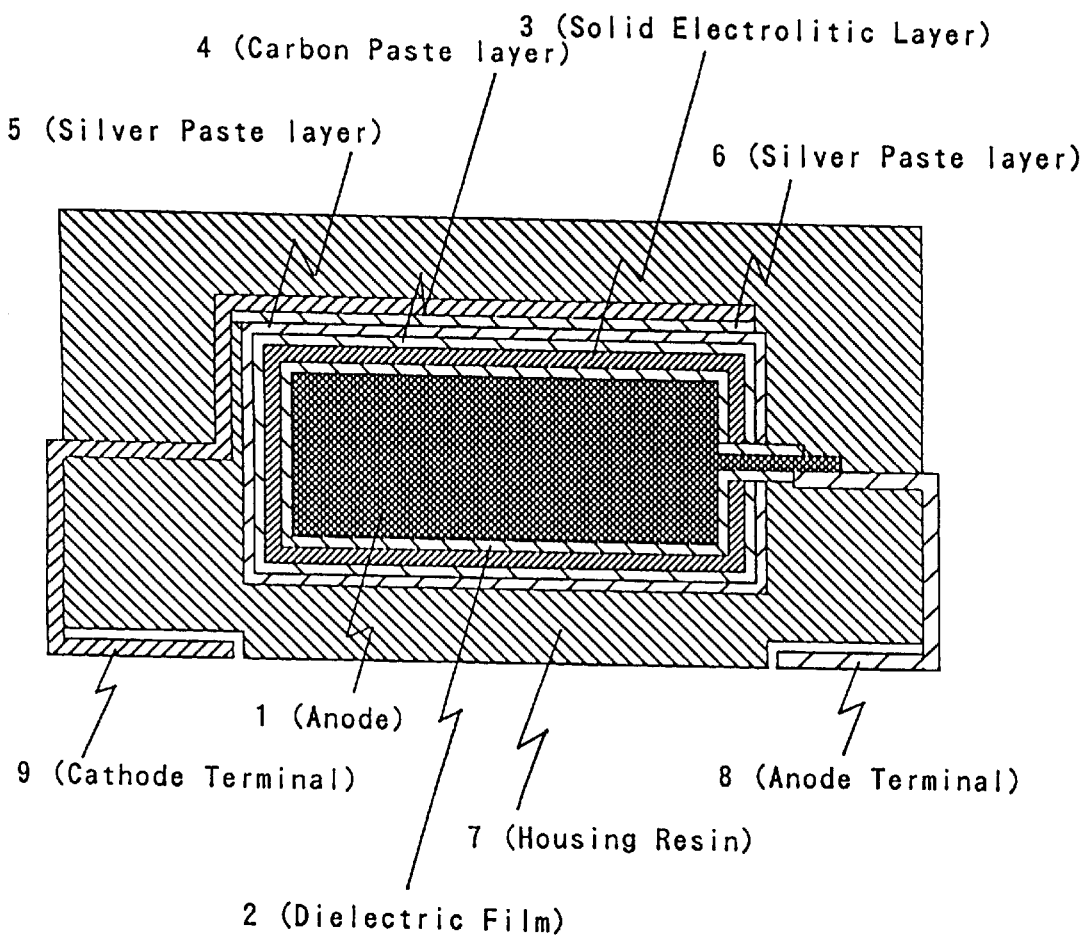
FIG. 1 is a sectional view of a solid electrolytic capacitor fabricated in Examples.

While the invention is described in further detail below based on its embodiment, the invention is in no way limited to the following embodiment but may be carried out in a properly modified fashion as long as such a modification does not result in a substantial alteration of the spirit of the present invention.

EXAMPLE 1

A porous sintered tantalum was subjected to anodic oxidation, thereby forming a dielectric film made from tantalum oxide on the surface thereof. Then, the sintered tantalum bearing the dielectric film thereon was immersed in an aqueous solution containing 20 wt. % of hydrogen peroxide (oxidizing agent) and 1 wt. % of sulfuric acid for 30 minutes, and dried for 5 minutes at room temperature. The sintered tantalum was then exposed to pyrrole vapor for 30 minutes, thereby forming a polypyrrole film (vapor phase polymerized film) on the dielectric film. Since this polypyrrole film is doped with sulfuric acid ions, the polypyrrole film is provided with a conducting property.

Subsequently, the sintered tantalum bearing the dielectric film on which the polypyrrole film had been formed was immersed in a solution for electrolytic polymerization (an aqueous solution containing 0.2M of pyrrole, 0.06M of sodium dodecylsulfonate and 0.0003M of sulfuric acid). Then, with a stainless steel lead (anode terminal) attached to the aforementioned polypyrrole film, electrolytic polymerization (polymerization by electrolytic oxidation) was performed at a constant current to form a solid electrolytic layer on the polypyrrole film, the solid electrolytic layer being made from a conducting polymer obtained by doping polypyrrole with dodecyl sulfonic acid ions and sulfuric acid ions. Also as a counter electrode (cathode), a stainless steel electrode was used.

Subsequently, the sintered tantalum bearing the polypyrrole film on which the solid electrolytic layer had been formed was washed with water and dried. Then, a carbon paste and a silver paste were applied on the solid electrolytic layer in this order. A cathode terminal made from aluminum was attached to the silver paste and an anode terminal made from aluminum was attached to a terminal-fixing portion (bare portion) of the sintered tantalum. Further, a main body of the resultant capacitor excluding portions for taking out electric energy of the cathode and anode terminals was housed in an epoxy resin to fabricate a solid electrolytic capacitor A1 (first capacitor).

FIG. 1 is a schematic sectional view of the solid electrolytic capacitor A1 fabricated in this embodiment. The solid electrolytic capacitor A1 shown comprises an anode (of sintered tantalum) 1, a dielectric film (of tantalum oxide) 2, a solid electrolytic layer 3, a carbon paste layer 4, a silver paste layer 5, a silver paste layer 6, a housing resin (epoxy resin) 7, an anode terminal 8, a cathode terminal 9, and so on. The surface of the anode 1 is roughened by electropolishing and the dielectric film 2 is formed on this roughened surface by the anodic oxidation. The solid electrolytic layer 3 is formed on the dielectric film 2 by the electrolytic polymerization. The solid electrolytic layer 3 is connected with a cathode including the carbon paste layer 4, the silver paste layer 5 and the silver paste layer 6. The anode terminal 8 is connected with the anode 1 and the cathode terminal 9 is connected with the silver paste layer 6, so that electric energy stored in the solid electrolytic capacitor A1 by charge can be taken out through these terminals. The entire main body of the solid electrolytic capacitor A1 is housed in the housing resin 7 with parts of the anode terminal 8 and the cathode terminal 9 exposed.

EXAMPLE 2

A solid electrolytic capacitor A2 (first capacitor) was fabricated in the same manner as in Example 1 except that an aqueous solution containing 0.2M of pyrrole, 0.06M of sodium dodecylsulfonate and 0.003M of nickel sulfate was used as the solution for electrolytic polymerization instead of the aqueous solution containing 0.2M of pyrrole, 0.06M of sodium dodecylsulfonate and 0.0003M of sulfuric acid.

EXAMPLE 3

A solid electrolytic capacitor A3 (first capacitor) was fabricated in the same manner as in Example 1 except that an aqueous solution containing 0.2M of pyrrole, 0.06M of sodium dodecylsulfonate and 0.003M of zinc sulfate was used as the solution for polymerization solution instead of the aqueous solution containing 0.2M of pyrrole, 0.06M of sodium dodecylsulfonate and 0.0003M of sulfuric acid.

EXAMPLE 4

A solid electrolytic capacitor A4 (first capacitor) was fabricated in the same manner as in Example 1 except that an aqueous solution containing 0.2M of N-methylpyrrole, 0.06M of sodium dodecylsulfonate and 0.0003M of sulfuric acid was used as the solution for electrolytic polymerization instead of the aqueous solution containing 0.2M of pyrrole, 0.06M of sodium dodecylsulfonate and 0.0003M of sulfuric acid.

EXAMPLE 5

A solid electrolytic capacitor A5 (first capacitor) was fabricated in the same manner as in Example 1 except that an aqueous solution containing 0.2M of thiophene, 0.06M of sodium dodecylsulfonate and 0.0003M of sulfuric acid was used as the solution for electrolytic polymerization instead of the aqueous solution containing 0.2M of pyrrole, 0.06M of sodium dodecylsulfonate and 0.0003M of sulfuric acid.

EXAMPLE 6

A solid electrolytic capacitor A6 (first capacitor) was fabricated in the same manner as in Example 1 except that an aqueous solution containing 0.2M of N-methylthiophene, 0.06M of sodium dodecylsulfonate and 0.0003M of sulfuric acid was used as the solution for electrolytic polymerization instead of the aqueous solution containing 0.2M of pyrrole, 0.06M of sodium dodecylsulfonate and 0.0003M of sulfuric acid.

EXAMPLE 7

A solid electrolytic capacitor A7 (second capacitor) was fabricated in the same manner as in Example 1 except that an aqueous solution containing 0.2M of pyrrole and 0.06M of sodium dodecylsulfonate was used as the solution for electrolytic polymerization instead of the aqueous solution containing 0.2M of pyrrole, 0.06M of sodium dodecylsulfonate and 0.0003M of sulfuric acid.

EXAMPLE 8

A solid electrolytic capacitor A8 (second capacitor) was fabricated in the same manner as in Example 1 except that an aqueous solution containing 0.2M of N-methylpyrrole and 0.06M of sodium dodecylsulfonate was used as the solution for electrolytic polymerization instead of the aqueous solution containing 0.2M of pyrrole, 0.06M of sodium dodecylsulfonate and 0.0003M of sulfuric acid.

EXAMPLE 9

A solid electrolytic capacitor A9 (second capacitor) was fabricated in the same manner as in Example 1 except that an aqueous solution containing 0.2M of thiophene and 0.06M of sodium dodecylsulfonate was used as the solution for electrolytic polymerization instead of the aqueous solution containing 0.2M of pyrrole, 0.06M of sodium dodecylsulfonate and 0.0003M of sulfuric acid.

EXAMPLE 10

A solid electrolytic capacitor A10 (second capacitor) was fabricated in the same manner as in Example 1 except that an aqueous solution containing 0.2M of N-methylthiophene and 0.06M of sodium dodecylsulfonate was used as the solution for electrolytic polymerization instead of the aqueous solution containing 0.2M of pyrrole, 0.06M of sodium dodecylsulfonate and 0.0003M of sulfuric acid.

Comparative Example 1

A comparative capacitor B1 was fabricated in the same manner as in Example 1 except that an aqueous solution containing 0.2M of pyrrole and 0.06M of sodium borofluoride was used as the solution for electrolytic polymerization instead of the aqueous solution containing 0.2M of pyrrole, 0.06M of sodium dodecylsulfonate and 0.0003M of sulfuric acid.

Comparative Example 2

A comparative capacitor B2 was fabricated in the same manner as in Example 1 except that an aqueous solution containing 0.2M of pyrrole and 0.06M of sodium perchlorate was used as the solution for electrolytic polymerization instead of the aqueous solution containing 0.2M of pyrrole, 0.06M of sodium dodecylsulfonate and 0.0003M of sulfuric acid.

Comparative Example 3

A comparative capacitor B3 was fabricated in the same manner as in Example 1 except that an aqueous solution containing 0.2M of pyrrole and 0.06M of sodium dodecylbenzenesul fonate was used as the solution for electrolytic polymerization instead of the aqueous solution containing 0.2M of pyrrole, 0.06M of sodium dodecylsulfonate and 0.0003M of sulfuric acid.

Comparative Example 4

A comparative capacitor B4 was fabricated in the same manner as in Example 1 except that an aqueous solution containing 0.2M of pyrrole and 0.06M of sodium naphthalene sulfonate was used as the solution for electrolytic polymerization instead of the aqueous solution containing 0.2M of pyrrole, 0.06M of sodium dodecylsulfonate and 0.0003M of sulfuric acid.

Capacitance, Capacitance Lowering Ratio and Impedance After Aging

The capacitance of the capacitors A1–A10 of the invention and the comparative capacitors B1–B4 were measured at 120 Hz. Then, after keeping the capacitors at 200° C. for 3 hours for aging, the capacitance at 120 Hz and impedance at 100 kHz were measured. Table 1 shows the capacitance at 120 Hz after aging, the capacitance lowering ratio defined by the following formula (1) and the impedance at 100 kHz after the aging of each capacitor:

Capacitance lowering ratio (%)=[(C1−C2)/C1]×100   (1)

wherein C1 indicates the capacitance at 120 Hz before aging and C2 indicates the capacitance at 120 Hz after aging.

TABLE 1

| Solid electrolytic capacitor | Capacitance ($\mu$F) | Capacitance lowering ratio (%) | Impedance (m$\Omega$) |
|---|---|---|---|
| A1  | 150 | 0.7 | 30  |
| A2  | 153 | 0.7 | 29  |
| A3  | 151 | 0.7 | 30  |
| A4  | 152 | 0.8 | 40  |
| A5  | 159 | 1.2 | 25  |
| A6  | 160 | 1.5 | 21  |
| A7  | 160 | 0.8 | 20  |
| A8  | 162 | 0.9 | 20  |
| A9  | 161 | 1.0 | 25  |
| A10 | 160 | 1.2 | 25  |
| B1  | 140 | 7.8 | 300 |
| B2  | 140 | 9.7 | 330 |
| B3  | 150 | 3.0 | 90  |
| B4  | 150 | 2.9 | 89  |

As shown in Table 1, the capacitors A1–A10 of the present invention have larger capacitance, smaller capacitance lowering ratios and lower impedance than the comparative capacitors B1–B4.

Tantalum was used as the material for the anode in Examples 1–10, but also when aluminum is used as the material for the anode, a solid electrolytic capacitor having large capacitance and exhibiting low impedance in a high frequency region can be similarly obtained.

Although sodium dodecylsulfonate was used in Examples 1–10, any other sodium alkyl sulfonate can be used instead. Furthermore, it is possible to use any metallic salt other than sodium salt, or an ammonium salt (such as quaternary ammonium salt) can be used instead of sodium salt.

Although water was used as a solvent for the solution for electrolytic polymerization in Examples 1–10, any solvent can be used as far as the heterocyclic monomer and the dopant can be dissolved therein.

INDUSTRIAL APPLICABILITY

A solid electrolytic capacitor having large capacitance and exhibiting low impedance in a high frequency region is provided.

What is claimed is:

1. A solid electrolytic capacitor comprising an anode, a dielectric film formed on the anode by anodic oxidation, a solid electrolytic layer formed on the dielectric film, and a cathode connected with the solid electrolytic layer, the solid electrolytic layer being made from a conducting polymer obtained by doping, with alkyl sulfonic acid ions, a polymer including a heterocyclic monomer unit represented by the following general formula as a repeating unit in a ratio of one of the alkyl sulfonic acid ions per 2 through 5 heterocyclic monomer units represented by the general formula:

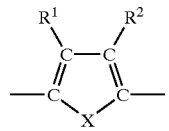

wherein $R^1$ and $R^2$ independently indicate an alkyl group or H, and X indicates S or $NR^3$ in which $R^3$ indicates an alkyl group or H.

2. A solid electrolytic capacitor comprising an anode, a dielectric film formed on the anode by anodic oxidation, a solid electrolytic layer formed on the dielectric film, and a cathode connected with the solid electrolytic layer, the solid electrolytic layer being made from a conducting polymer obtained by doping, with alkyl sulfonic acid ions and sulfuric acid ions, a polymer including a heterocyclic monomer unit represented by the following general formula as a repeating unit:

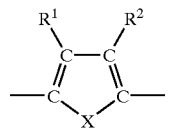

wherein $R^1$ and $R^2$ independently indicate an alkyl group or H, and X indicates S or $NR^3$ in which $R^3$ indicates an alkyl group or H.

3. The solid electrolytic capacitor according to claim 2, wherein the polymer is doped in a ratio of one of alkyl sulfonic acid ions and sulfuric acid ions per 2 through 5 heterocyclic monomer units represented by the general formula.

4. The solid electrolytic capacitor according to any of claim 1, 2 or 3, wherein the anode and the cathode are made from aluminum or tantalum.

* * * * *